May 11, 1965     G. E. AUDY     3,182,552

NINE POINT FLOTATION MIRROR HOLDING DEVICE

Filed July 9, 1962

Inventor — Gerard E. Audy

United States Patent Office

3,182,552
Patented May 11, 1965

3,182,552
NINE POINT FLOTATION MIRROR HOLDING DEVICE
Gerard E. Audy, 2207 Van Buren Place, Wilmington, Del.
Filed July 9, 1962, Ser. No. 208,455
3 Claims. (Cl. 88—96)

This invention relates to a mirror holding device for optical instruments. More particularly it relates to an improvement in a 9-point flotation cell for holding a mirror in optical devices.

As far as I know, the present invention provides the first practical 9-point flotation cell receptacle for holding a mirror for proper positioning in such apparatus as telescopes, heliostats, coelostats, Schlieren optical systems, and the like. This is demonstrated by remarkable and immediate acceptance of my invention by both amateur and professional opticans throughout the United States.

Figure 1:
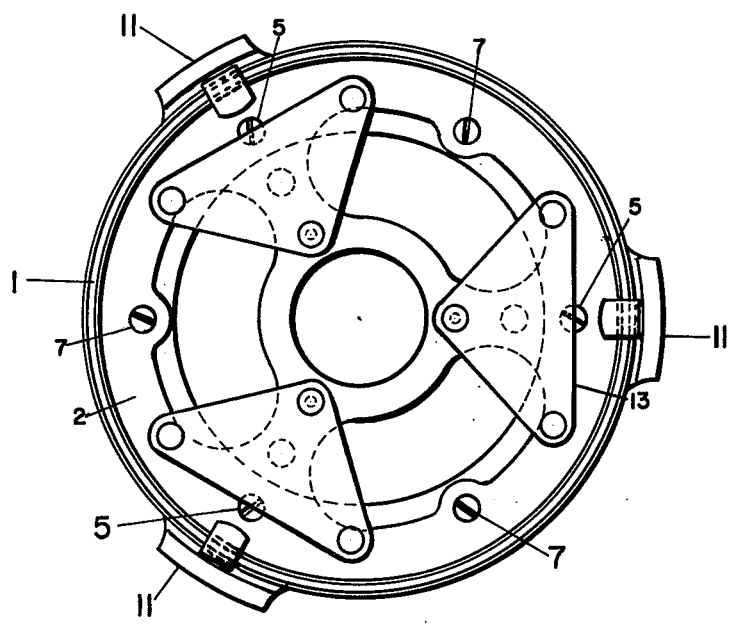
Figure 2:
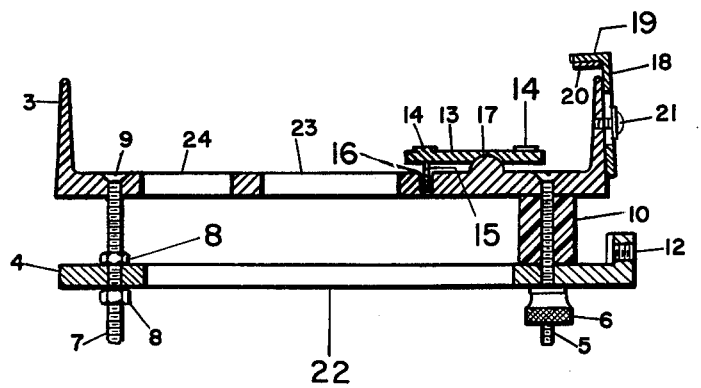

In the attached drawing FIGURE 1 is a plan view of a representative 9-point flotation cell of my invention and FIGURE 2 is a front elevation in section of the device of FIGURE 1.

It is known that a reflecting mirror in a scientific optical instrument must be held with great precision and care. Although restraint upon the mirror must be strong and firm, it is imperative that localized stresses not be overapplied or else deformation of the mirror can easily result. Gripping of the mirror must be done in some mechanical way that assures absence of uneven strains and pressures with their attendant intolerable flexure of the reflecting surface.

Although it is generally recognized that flotation cells involve the best principles for attaining the desired results spoken of above, as far as I know there are absolutely no flotation cell devices available on the market today.

There are good reasons for this. Previous attempts to construct 9-point flotation cells have been clumsy and unsatisfactory. These attempts resulted in devices that were inordinantly expensive, heavy, and difficult to assemble. The devices frequently involved machined parts, as well as a considerable number of separate parts. And even when completed and assembled, because of the faults inherent in their design they often allowed intolerable image distortion due to deformation of the mirror surface as a result of uneven strain distribution.

In a particular feature I have also found a way to reduce markedly the tendency of mirror gripping means in a flotation cell to chip the edge of the mirror being held in the cell.

I will now describe a representative device of my invention.

Referring to the attached drawing, the principal element of the structure is the receptacle or cup 1 having a bottom 2 and sides 3. Into this cup 1 the mirror can be placed for holding.

The cup 1 and its associated elements is adjustably secured to ring shaped mounting plate 4 by three adjusting screws 5 which are symmetrically spaced through suitable countersunk holes in cup bottom 2. Each adjusting screw 5 is releasably held in position by adjusting thumb nut 6. Three locking screws 7 with coacting locking nuts 8 are provided symmetrically and midway on the arc between the three adjusting screws 5. The adjusting screws 5 and the locking screws 7 are conveniently flat-headed and countersunk as illustrated at 9 in FIGURE 2. Resilient bumper or sleeve 10 serves to urge plate 4 against thumb nut 6 and also of course prevent contact between the underside of cup 1 and plate 4. In mounting plate lug 11 is tapped hole 12 for insertion of any suitable means such as a screw for mounting the entire illustrated assembly (and mirror) into an optical device.

Within cup 1 are provided exactly three triangular supporting plate members or pads 13 having on each upper surface exactly three projections 14 for contacting and supporting the back or non-reflecting surface of the mirror. Although it is imperative according to my invention that each plate member or pad 13 sit or float on a single free pivot 17 as will be described, at the same time it is essential to prevent any rotation of the pad in its own plane about the pivot. Such undesired rotation can easily be prevented by any suitable locking means such as pin 15 projecting into recess 16 in the cup bottom 2.

One of the most important features of my device lies in the substantially single-point pivot connection supporting pad 13 on cup bottom 2. As shown in the drawing, ball and cup elements 17 in bottom 2 and pad 13 are very suitable. It will be understood however, that equivalent single-point pivot connections can be used for transferring the weight supported by pad 13 to the cup bottom 2 through a single contact point. For example, a conical projection on bottom 2 could insert nicely into a slightly larger conical depression in the bottom of pad 13.

The mirror after placement upon the three pads 13 is held in place by a plurality of holding clips 18 each having protruding arm 19 for restraining the mirror. Beneficial results are obtained when the underside or mirrorside of arm 19 is provided with a cushion or pad 20 to minimize scratching or marring of the mirror surface and help prevent chipping. Clip 18 is adjustably secured to cup side 3 by any suitable means such as clamping or holding screw 21 through an elongated slot in clip 18.

A separate feature of my device gives uniquely improved results. As shown in the drawing, the outer wall of cup side 3 is not exactly perpendicular to the plane of the cup bottom. It tilts inwardly so that the protruding arm 19 on clip 18 is positioned at an angle of from about 0.5–5 degrees from the horizontal or from a plane parallel to the plane of the cup bottom. This feature, although only a slight declination of the restraining arm 19, serves remarkably to hold the mirror with more authority, with greater firmness and with less likelihood to chip the mirror edge. It is not a simple matter of merely applying a greater pressure to hold the mirror, nor only of applying pressure over a wider area, but rather my development achieves outstanding restraint without uneven pressure and without uneven strain or deformation due to mirror flexure.

Other features of my device include large cutaway portions in the cup and mounting plate, including holes 22 and 23 and areas 24. This of course makes the device lighter and more economical to construct. Furthermore it renders it entirely suitable for use in Cassegrainian telescopes and similar instruments.

Lateral restraint can be used to secure the mirror additionally if desired by means such as jack screws with swiveling pads for adjustability around the periphery of cell cup 3.

One outstanding advantage of the apparatus illustrated in the drawing resides in the use of the three locking screws 7 separately and in addition to the three adjusting screws 5. As far as I know, all previous systems have incorporated the locking function on the adjusting screws. I have now divorced these two functions with excellent results. It is now in my device not possible to disturb the adjustment while proceeding to lock after adjustment, as could readily happen in prior devices. Furthermore, by this simple yet unique approach, I have at the same time doubled the support between cup and mounting plate.

My device can be used to support and hold a mirror of any practical size but finds greatest application with mirrors in the 8, 10, 12 and 16 inch average diameter range. The cell can conveniently be up to about 0.5 inch diameter larger than the mirror for a nice fit.

It will be apparent that the nine projecting points 14 on the pads 13 are positioned with respect to each other in the usual manner for a nine-point flotation cell, i.e. so each will support a substantially equal portion of the weight of the mirror. These positions can be calculated by elementary geometry by persons in the art in accordance with established principles. By way of explanation an inner circle is drawn of radius 0.204 times the mirror diameter and three points equally spaced on this circle bear one-third the weight of the mirror. An outer circle is drawn of radius 0.408 times the mirror diameter and six points equally spaced on this circle bear two-thirds the weight of the mirror.

To transfer the weight to the cell, the nine-points are grouped into three identical isosceles triangles. The single-point pivot connection 17 is located at the centroid of each such triangle which is the point at which the triangle (or weight on the triangle) would balance if placed on a pivot. In an isosceles triangle the centroid is of course located on the height, one-third of the way from the base to the apex. The centroids of the triangles are spaced equally on a circle of radius 0.304 times the mirror diameter.

Because the backs of most mirrors are not perfectly flat, the triangle (pad 13) must be able to tilt on its centroid, yet must be kept from rotating in its own plane to keep the nine-points in their proper positions. In practice the triangular pads 13 are kept from rotating horizontally by pins 15 fitting loosely in holes 16.

Most mirrors are not precisely cylindrical and their edges are bevelled so that the mirror is shaped roughly like the frustum of a con. A mirror of this type weighs less than a cylindrical mirror of the same aperture, as will be understood, so that the mirror diameter used in the above calculations in such a case should be an average of the diameters of the front and back of the mirror.

The cell of this invention has the advantages of being light, simple to construct, and easy to use. All major parts can be made as simple castings and no machining is required. Absolutely no mechanical linkages are involved. The cell is inexpensive to make and standard materials can be used.

The simple yet rugged cell provides accuracy of up to one-twentieth the wavelength of light. It is now being used in scientific establishments and is received wide acceptance in the field by both amateurs and professionals.

The invention claimed is:

1. In a nine point flotation cell device for holding a circular mirror, said cell having three supporting plate members each having three upward projections for contacting the mirror making a total of nine mirror-contacting projections, the nine projections being spaced with respect to each other in the usual manner so each will support a substantially equal portion of the weight of the mirror, the improvement of having each supporting plate member resting on a single-point pivot connection integral with the bottom of the cell, making a total of three single-point pivot connections which are spaced with respect to each other so each will support a susbtantially equal portion of the weight of the mirror, said nine projections arranged to form three identical isosceles triangles, each of said three triangles having its apex pointed toward the center of the mirror, each said apex being equidistant from the apex of each other of said triangles and each said apex located on a circle whose center is coincident with the center of the mirror and whose radius is 0.204 times the mirror diameter; the centroid of each of said triangles being equidistant from the centroid of each other of said triangles and each said centroid located on a circle whose center is coincident with the center of the mirror and whose radius is 0.304 times the mirror diameter; and the six base line end points of said three triangles being equally spaced on a circle whose center is coincident with the center of the mirror and whose radius is 0.408 times the mirror diameter.

2. A device as set forth in claim 1 which additionally has restraining means for preventing each said supporting plate member from rotating about its single-point pivot connection in a plane coincident with said plate member.

3. A device as set forth in claim 2 wherein each said single-point pivot connection comprises a rounded half-ball protuberance integral with said bottom of the cell coacting pivotally with a correspondinig slightly larger hemispherical socket in said supporting plate member.

References Cited by the Examiner

UNITED STATES PATENTS 2,003,171  5/38  Burrell _____ 88—32
2,817,998  12/57 Nieuwenhoven _____ 88—97

FOREIGN PATENTS 1,039,252  9/58  Germany.

JEWELL H. PEDERSEN, *Primary Examiner.*